United States Patent
Steele (10) Patent No.: US 12,270,755 B2
(45) Date of Patent: Apr. 8, 2025

(54) PORTABLE DETECTION AND QUANTIFICATION METHOD FOR DELTA 9 THC

(71) Applicant: Purdue Research Foundation, West Lafayette, IN (US)

(72) Inventor: Charles A. Steele, West Lafayette, IN (US)

(73) Assignee: Purdue Research Foundation, West Lafayette, IN (US)

(*) Notice: Subject to any disclaimer, the term of this patent is extended or adjusted under 35 U.S.C. 154(b) by 539 days.

(21) Appl. No.: 17/091,063

(22) Filed: Nov. 6, 2020

(65) Prior Publication Data

US 2021/0131952 A1 May 6, 2021

Related U.S. Application Data (60) Provisional application No. 62/931,248, filed on Nov. 6, 2019.

(51) Int. Cl.
  *G01N 21/31* (2006.01)
  *G01N 21/78* (2006.01)

(52) U.S. Cl.
  CPC ......... *G01N 21/3103* (2013.01); *G01N 21/78* (2013.01); *G01N 2201/062* (2013.01)

(58) Field of Classification Search
  CPC .............. G01N 21/3103; G01N 21/78; G01N 2201/062
  See application file for complete search history.

(56) References Cited

U.S. PATENT DOCUMENTS

| | | | | |
|---|---|---|---|---|
| 2,682,801 A | * | 7/1954 | Davidson ................. | G01J 3/51 |
| | | | | 250/233 |
| 2010/0243876 A1 | * | 9/2010 | Resch-Genger ....... | G01N 21/64 |
| | | | | 250/252.1 |

FOREIGN PATENT DOCUMENTS

EP          481519 B1  *  1/1995  ......... C09B 67/0033

OTHER PUBLICATIONS

Sheffield Hallam Univeristy, UV-Vis Absorption Spectroscopy Instrumentation, Weblink: https://teaching.shu.ac.uk/hwb/chemistry/tutorials/molspec/uvvisab3.htm#, accessed on Sep. 16, 2020, 4 pages.
Carl R. Phillips, V. Drug Testing Procedures in Crime Laboratories, Valparaiso University Law Review, 1974, pp. 655-679, vol. 8 n3, ValpoScholar.

* cited by examiner

*Primary Examiner* — Brian J. Sines
(74) *Attorney, Agent, or Firm* — Reichel Stohry Dean LLP; Natalie J. Dean (57) ABSTRACT

Provided are methods, devices, and systems for identifying the concentration of delta-9-tetrahydrocannabinol (Δ-9 THC) in a given sample. The system allows for in situ formation of a chromophore eliminating the use of chloroform, wherein said chromophore absorbance spectra is measured using a spectroscopy method within a light wavelength range. The system allows for calculating the concentration of Δ-9 THC using the linear relationship between the Δ-9 THC level and the intensity of the color change in the present tester. Said linear relationship is obtained because the tester of the present disclosure allows the chromophore formation reaction go to completion.

15 Claims, 6 Drawing Sheets

PORTABLE DETECTION AND QUANTIFICATION METHOD FOR DELTA 9 THC

CROSS REFERENCE

This application claims the benefit of U.S. Provisional Application No. 62/931,248 filed on Nov. 6, 2019. This application expressly incorporates by reference this provisional patent application.

FIELD

The present disclosure relates to the field of preliminary tests that can identify the concentration of delta-9-tetrahydrocannabinol (Δ-9 THC) in a given sample.

BACKGROUND

Hemp based consumables are now legal in almost every part of the United States. Most jurisdictions however have set a limit on the delta-9-tetrahydrocannabinol (Δ-9 THC) content of such products at around 0.3%. Currently law enforcement officers only have a yes/no indicator test (Duquenois Levine Test) designed to detect marijuana to assess these legal hemp products. The Duquenois Levine Test is not a quantification test. It is a color yes or color no indicator with no built in threshold determination. Lower limit of detection in a visual color test is a function of how well the person viewing the sample can see in that color range. For example, most people will see a blue shade in a transparent liquid down to around 40 ppm. After about 5 ppm most people will not be able to tell if it is there. Legal hemp products including Δ-9 THC at or around 0.3% will produce a positive reaction with the Duquenois Levine Test; possible leading to a wrongful arrest.

With a positive preliminary test, the product would then be sent to a crime lab for confirmation testing. In most cases this is done by microscopic analysis. Even when properly done, the microscopist should fail to confirm the presence of marijuana unless leaves are present. When properly performed, the crime lab confirmation testing represents a significant cost in man hours and overhead to the municipality that funds the crime lab and the police department. In addition, ground product has been misidentified in numerous cases as marijuana because of the presence of characteristic cystolithic fibers. Even assuming that the wrongfully identified suspect is able to clear his name at trial, the municipality now adds court costs to the process.

What is needed therefore is a better preliminary test that can identify the concentration of Δ-9 THC. Such a test would provide law enforcement officers with a proper means to determine legal vs. illegal products and give probable cause for arrest. Such a tester would also have a secondary market for persons and organizations in the legal hemp and marijuana markets as a quality control method to determine conformance with legal requirements.

SUMMARY

The tester of the present disclosure is a modification of the existing Duquenois Levine Test. Color always exists to some extent. A person with good color acuity with proper lighting may be able to see trace amounts in ppm range. However a good spectrophotometer can read into the parts per trillion range. However, the present disclosure tester has several advantages over the existing test.

The existing test uses chloroform which is toxic and dangerous to work with. The tester of the present disclosure has eliminated use of this chemical.

The use of chloroform provides for an inconsistent extraction of the chromophore related to the Δ-9 THC level. Although equilibrium can be achieved under laboratory conditions, use conditions include inconsistent temperature and agitation. The tester of the present disclosure does not include an extraction step.

The existing test does not provide a means of quantifying the Δ-9 THC level. The tester of the present disclosure provides a color change wherein the intensity of the color change is linearly related to the Δ-9 THC level. The linear relationship between the Δ-9 THC level and the intensity of the color change in the present tester is obtained because the tester of the present disclosure is designed to let the reaction go to completion.

The existing test does not control the reaction rate.

The existing test does not have a means to eliminate false positives. The existing test is evaluated visually. The human description of color is represented in many different ways. One of the most significant is the CIELab system. In this system two different color measurements are measured for their relative impact on a three dimensional color axis. In this system humans tend not to notice a difference of less than a 1-1.5 DE. If considering single components, then the single component is usually enough for the viewer to differentiate one item from another. However, what the eye sees is the combination of all photons reaching it. Thus, two compounds with significantly different spectrophotometric absorption curves can produce a set of photons that the human eye perceives as the same color.

The tester of the present disclosure includes colorimetric data which can differentiate between a true positive and a false positive. The colorimetric data is based on the absorption curve so even things that appear similar to the eye can be differentiated.

One aspect of the disclosure is a method of quantification of delta-9-tetrahydrocannabinol (Δ-9 THC), the method comprising providing a sample comprising delta-9-tetrahydrocannabinol, providing a testing solution comprising acetaldehyde, vanillin and ethanol, providing hydrochloric acid, wherein hydrochloric acid is mixed together with the testing solution or said hydrochloric acid is stored in a separate container, either adding the sample to the testing solution including hydrochloric acid to form a reaction mixture, or adding the sample to the testing solution then separately adding hydrochloric acid to the testing solution containing the sample to form a reaction mixture, wherein a chromophore is produced in the reaction mixture, wherein the reaction mixture is warmed to allow the reaction to substantially complete within 15 minutes, measuring the chromophore absorbance spectra within a light wavelength range using a spectroscopy method, and calculating the concentration of Δ-9 THC in said sample, wherein the light wavelength range used for the spectroscopy method is 550-625 nm.

The spectroscopy method can be UV-Vis spectroscopy.

The light wavelength range used for the spectroscopy method can be 580-615 nm.

In the method, no chloroform need be used to extract Δ-9 THC from aqueous layer to a nonaqueous layer.

The method may not include an extraction step.

Another aspect of the disclosure is a device for quantification of delta-9-tetrahydrocannabinol (Δ-9 THC), the device comprising a light source capable of providing a light with a wavelength range of 550-625 nm, a sample holder made from a material that can allow the light to pass, a testing solution, a heating element, a reference element as standard, a light filter element capable of allowing a light with wavelength range of 550-625 nm to pass, a photodiode detector; and a data output element, wherein a reaction mixture is generated by adding the sample and the testing solution into the sample holder; wherein the light is shone through the tester passing both the sample and the standard, then the light passes through the filter; wherein both optical paths, sample and standard, are sealed from each other so that there is no light bleed between the two, wherein a solid plastic standard is made from general purpose polystyrene (GPPS) with a combination of solvent violet 13 and solvent violet 38 at an approximate loading of 0.5% or with solvent 14, wherein a chromophore is produced in the reaction mixture, wherein the heating element can be used to speed up the complete production of the chromophore, wherein the detector measures the absorption of the chromophore, and wherein the data output generates the concentration of Δ-9 THC in said sample.

The light filter element can be capable of allowing a light with wavelength range of 580-615 nm to pass.

The light filter can be made from general purpose polystyrene (GPPS), wherein the GPPS is injection molded with a dye blend or with solvent 14, wherein the dye blend comprises nonmigratory dyes.

The dye blend can comprise a mixture of Solvent Green 28, Solvent Orange 7, Solvent Red 172 and Solvent Yellow 33.

The dye blend can comprise a mixture of Solvent Red 1, Solvent Red 207, solvent yellow 82, Vat Red 41 and Vat Yellow 82.

The light filter can be made from transparent resins, suitable to be injection molded, selected from the group consisting of: Acrylic, Poly Carbonate, Polyester, Polyethylene and Polylactic Acid.

The reference element used as a standard can be wedge-shaped such that the path length can be adjusted as needed.

The light source can be a white LED.

The light source can be GutReise E10 3V or 4.5V.

The optical filter can block wavelengths less than 560 nm and greater than 620 nm.

Each optical path can strike at least one Silicon photodiode capable of generating 0.3 to 0.4 A/W.

Each Silicon photodiode can be connected to at least one forward biased Germanium Diode requiring 0.3V to activate; wherein each Germanium Diode is then connected to at least one colored LED and ultimately, each optical path is connected back to each other and to a low voltage negative voltage source.

The wedge can be adjusted by a gear, wherein the gear is capable of raising or lowering the wedge, wherein the path length of the light passing through the wedge increases or decreases, causing a proportional change in the absorption of the standard.

The device can further comprise a dial calibrated to the existing color strength of solutions of known concentrations.

The light source can be a commercially available bulb.

BRIEF DESCRIPTION OF THE DRAWINGS

The above-mentioned and other features of this disclosure, and the manner of attaining them, will become more apparent and the disclosure itself will be better understood by reference to the following description of embodiments of the disclosure taken in conjunction with the accompanying drawings, wherein.

Corresponding reference characters indicate corresponding parts throughout the several views. Although the drawings represent embodiments of the present disclosure, the drawings are not necessarily to scale and certain features may be exaggerated in order to better illustrate and explain the present disclosure.

DETAILED DESCRIPTION OF THE EXEMPLARY EMBODIMENTS

The embodiments disclosed below are not intended to be exhaustive or limit the disclosure to the precise forms disclosed in the following detailed description. Rather, the embodiments are chosen and described so that others skilled in the art may utilize their teachings.

Experiments were performed with legal hemp buds containing Δ-9 THC. The buds were homogenized and tested utilizing various formula until the formulae described in the next section was determined. Solutions were prepared with samples were decreasing amounts from down to a level of 0.1 ppm and scanned using a visible light spectrophotometer from 350 to 1100 nm. The curve plot of absorbance vs concentration was found to be linear in the test range. More importantly, the curve shape remained consistent regardless of concentration.

The peak absorption for the reaction in ethanol was determined to be 590 nm. In order to prove that a linear concentration between Δ-9 THC and the absorbance is consistent a series of tests were run from the same homogenized sample of hemp buds.

Method:

The reaction solution was prepared according to the following formula:

| Component | % w/w |
|---|---|
| Acetaldehyde ($C_2H_4O$) | 2.38 |
| Vanillin ($C_8H_8O_3$) | 2.40 |
| Ethanol (Max water 5%) | 95.62 |
| Total | 100.00 |

Four hemp bulbs were homogenized in a kitchen herb blender.

One mg of the ground bulbs was added to a test vial.

Two mLs of the above reaction solution and 1.2 mLs of HCl were added and the vial was placed in a beaker of hot water (approx. 100° F.) for 5 minutes.

The vial was shaken and two mLs was extracted into a clean 10 ml volumetric flask and brought to 10 mLs with the reaction solution.

The solution was then scanned from 350 to 1100 nm.

Figure 4:
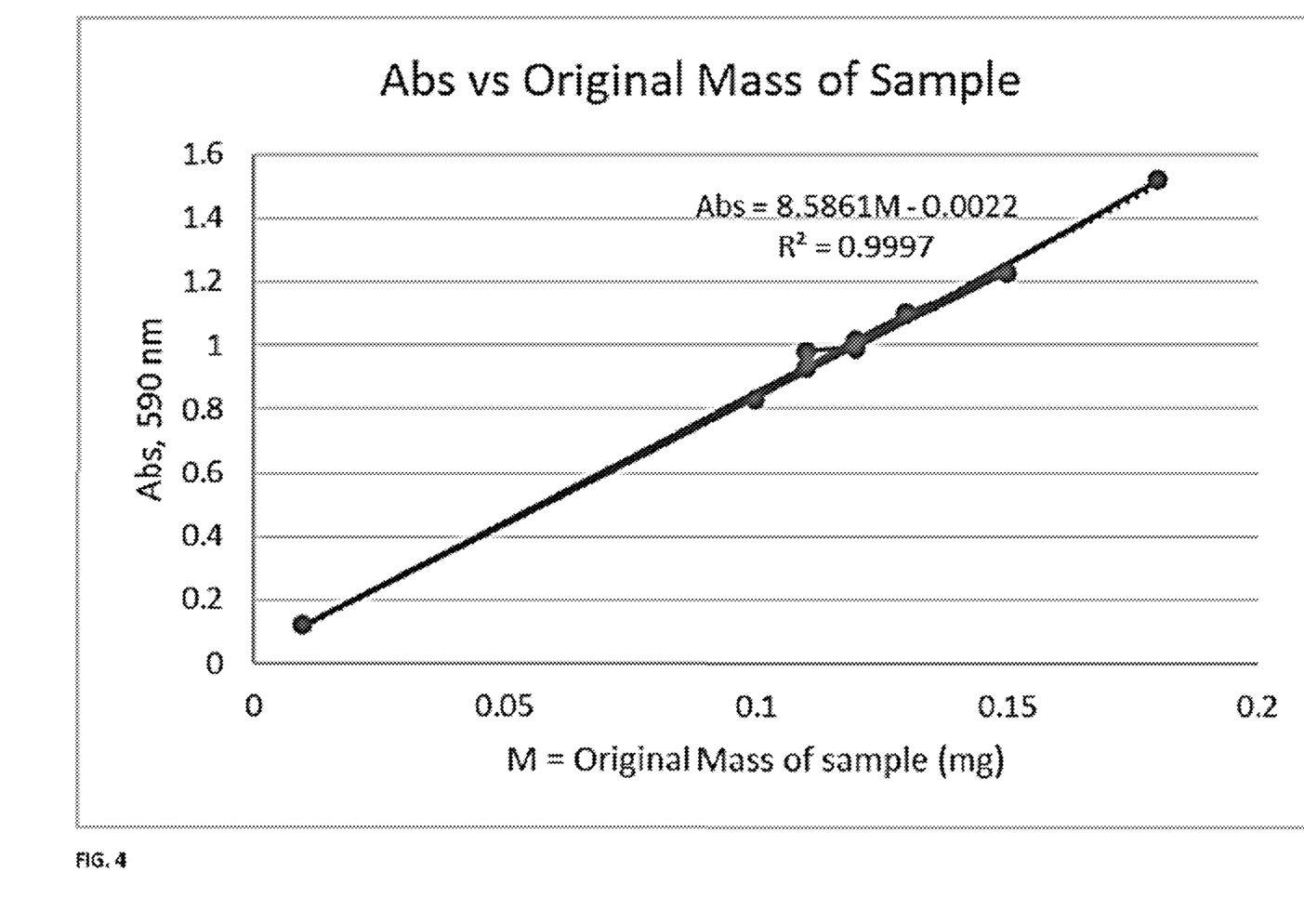
FIG. 4 is the graphic of the absorbance at 590 nm vs. original mass of sample for determining the extinction coefficient at 590 nm following the Beer's-Lambert equation.

Following the Beer's-Lambert equation, an extinction coefficient at 590 nm of 0.539±0.002 was determined from the following set of data. The graphic of the following set of data is shown in FIG. 4 with an R-squared value of 0.9997.

Abs vs Mass of sample:

| Test # | Abs | Original Mass of sample (mg) |
|---|---|---|
| 1 | 0.12 | 1.00 |
| 2 | 0.10 | 0.83 |
| 3 | 0.01 | 0.12 |
| 4 | 0.11 | 0.93 |
| 5 | 0.13 | 1.10 |
| 6 | 0.12 | 1.02 |
| 7 | 0.13 | 1.10 |
| 8 | 0.15 | 1.23 |
| 9 | 0.12 | 1.00 |
| 10 | 0.18 | 1.52 |
| 11 | 0.12 | 0.99 |
| 12 | 0.11 | 0.98 |

Figure 5:
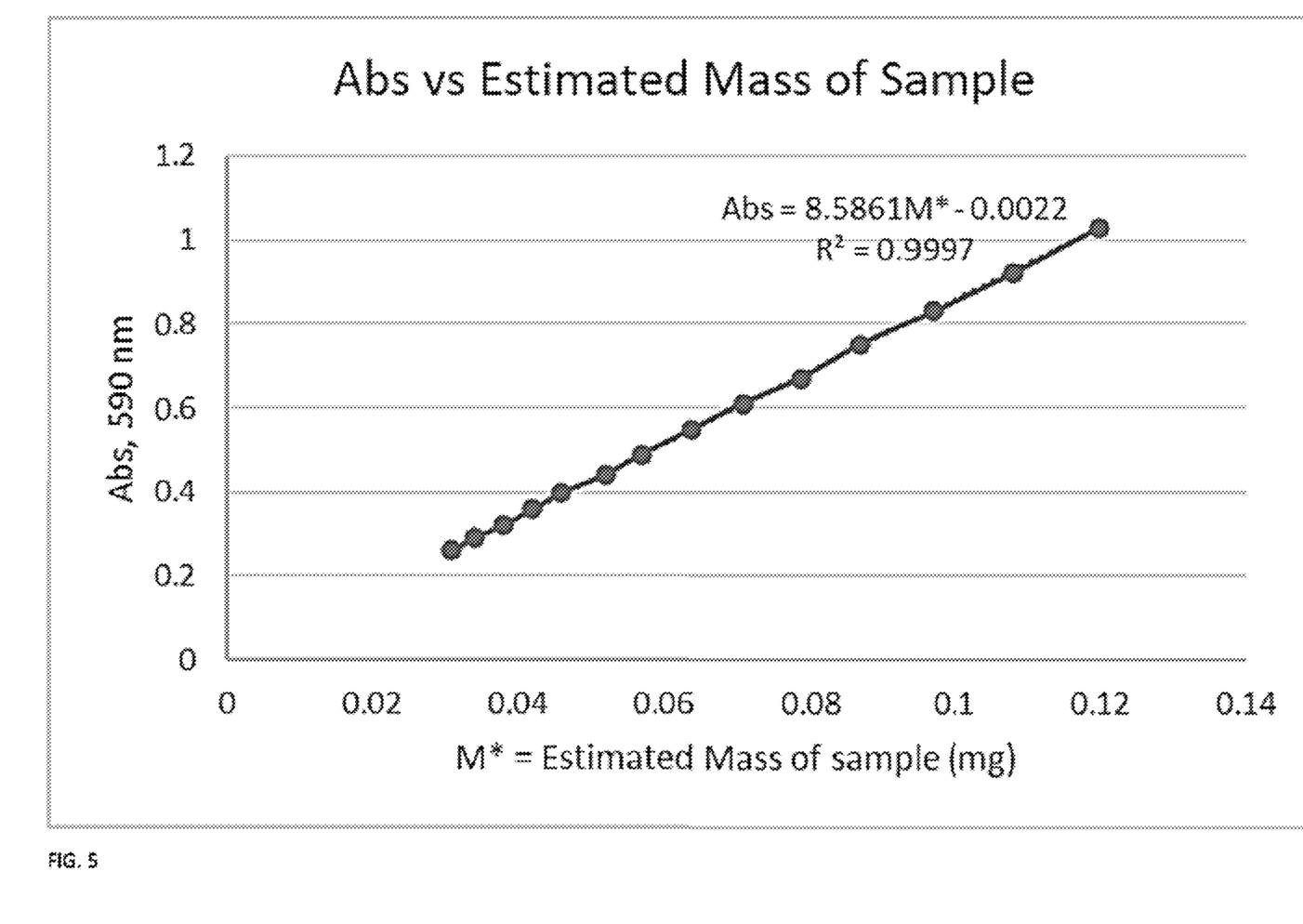
FIG. 5 is the graphic of the absorbance at 590 nm vs. estimated mass of sample for confirming the linear relationship between absorbance and mass of the sample.

Having determined that the peak generation was consistent, the second test was to vary the concentration of the reaction solution and confirm that the peak was linear. This test was conducted by preparing a master solution and performing a stepwise dilution. One ml of the master solution was added to a 10 ml volumetric flask and brought to 10 mLs with the reaction solution. Each subsequent dilution used the previous final solution as the master. Each concentration was again diluted to 90%. The graphic of the following set of data is shown in FIG. 5 with an R-squared value of 0.9997.

| Dilution # | Abs | Estimated Mass of sample (mg) |
|---|---|---|
| 0 | 0.120 | 1.03 |
| 1 | 0.108 | 0.92 |
| 2 | 0.097 | 0.83 |
| 3 | 0.087 | 0.75 |
| 4 | 0.079 | 0.67 |
| 5 | 0.071 | 0.61 |
| 6 | 0.064 | 0.55 |
| 7 | 0.057 | 0.49 |
| 8 | 0.052 | 0.44 |
| 9 | 0.046 | 0.40 |
| 10 | 0.042 | 0.36 |
| 11 | 0.038 | 0.32 |
| 12 | 0.034 | 0.29 |
| 13 | 0.031 | 0.26 |

Figure 6:
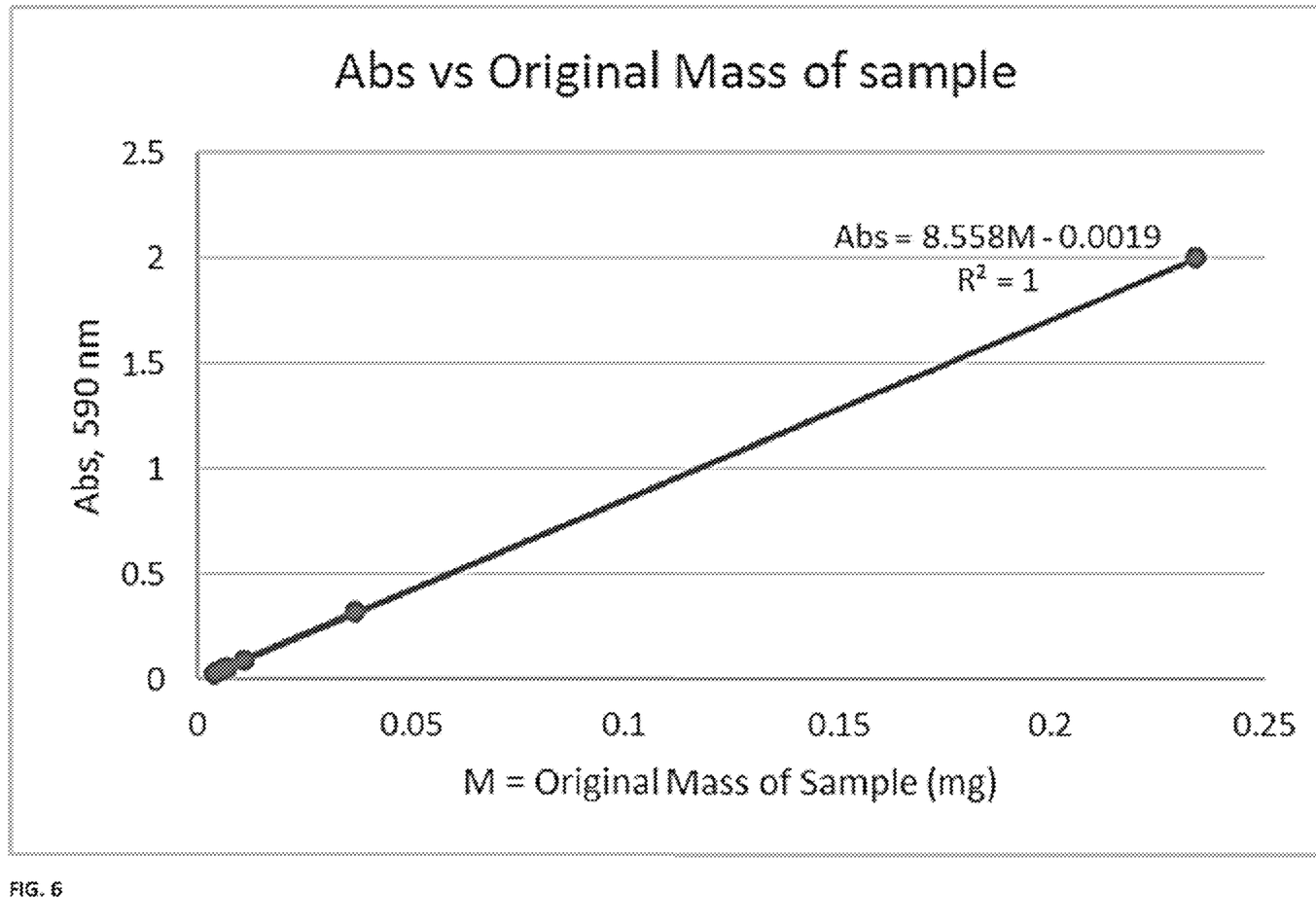
FIG. 6 is the graphic of the absorbance at 590 nm vs. original mass of sample for confirming that the quantification could be related to the mass of the sample.

The next step was to confirm that the quantification could be related to the mass of the sample. To do this several samples of variable mass were processed according to the method above. The graphic of the following set of data is shown in FIG. 6 with an R-squared value of 1.

Abs vs Mass of sample:

| Test # | Abs | Original Mass of sample (mg) |
|---|---|---|
| 1 | 0.011 | 0.09 |
| 2 | 0.234 | 2.00 |
| 3 | 0.006 | 0.05 |
| 4 | 0.007 | 0.06 |
| 5 | 0.004 | 0.03 |
| 6 | 0.037 | 0.32 |
| 7 | 0.004 | 0.03 |

Results of the mass vs absorbance testing were consistent with the two above tests demonstrating that the Δ-9 THC level can be quantified. The next step is to calibrate the curves to a sample of known strength. It is envisioned that the actual Δ-9 THC of the samples may be determined by an outside ISO certified analytical laboratory specializing in this type of testing.

A traditional Duquenois Levine Test was then performed where the chromophore was extracted into chloroform. Because the extracted color was in chloroform, several extraction solutions were used to dilute the sample to a range that the spectrophotometer could read. The color faded slowly in most solvents. Ultimately chloroform had to be used with the Duquenois Levine Test to achieve consistent results.

The test was performed much like the ethanol test, except that an additional step was involved adding two mLs of chloroform and shaking until the color had migrated to the chloroform. In most cases some residual color remained in the reaction solution.

The primary peak in chloroform was at 560 nm and the absorbance of each sample is in the table below.

Abs vs Mass of sample:

| Test # | Abs | Original Mass of sample (mg) |
|---|---|---|
| 1 | 0.046 | 1.10 |
| 2 | 0.062 | 1.00 |
| 3 | 0.017 | 1.40 |
| 4 | 0.031 | 0.98 |
| 5 | 0.029 | 0.60 |

The test results using chloroform were inconsistent. It should be noted that the Duquenois Levine Test is intended only as a presumptive test. If the chromophore migrates into the chloroform layer the test is considered positive. This is because a number of other plants will produce a color in the test, but none have been found to migrate into the chloroform.

The reagents of the tester of the present disclosure are the same as the reagents in the existing Duquenois Levine Test except for the use of chloroform. Besides other advantages that will become apparent in the following description of the tester of the present disclosure.

It should be noted that none of the colors produced is in fact identical. An absorption spectrum should therefore be able to rule out the "false positives" from color formed by the reaction with Δ-9 THC. Preliminary testing have been started on false positives, so far none has yielded the same color change. No other tested compound has been found with the same curve.

Our testing also determined that the presence of water impacts the results. More than 5% water starts to interfere with the test. Too much water present can completely prevent the reaction to go to completion. By 10% water the test stops working.

There are four viable approaches to preparing the tester. Each has different advantages and disadvantages for manufacturing. The following are common to all approaches:

Common to all disclosed approaches is the need for a sampling system that obtains approximately 1 mg of sample. Such sampling needles already exist for medical biopsies. A typical liver biopsy needle should be sufficient.

Once the sample is collected it is added to a test vial containing a test solution. The vials are then placed into an electronic scanner. All of the testers will need an optical filter element.

Optical Filter:

It is envisioned to use gratings, prisms or other common spectrophotometer elements. The tester of the present disclosure uses an optical filter. Referring to the FIG. 1 scan of the chromophore in ethanol in the Test Solution section of this document, the area of the scan citing a maximum absorption of 590 nm is the target range where light needs to be incident on the sample. The filter needs to block the rest of the visible range.

A suitable optical filter can be made from general purpose polystyrene (GPPS). GPPS can be injection molded with dyes proven to be nonmigratory. A suitable dye blend can be made from a mixture of: Solvent Green 28, Solvent Orange 7, Solvent Red 172 and Solvent Yellow 33. Alternatively, suitable dyes include Solvent Red 1. Solvent Red 207, solvent yellow 82, Vat Red 41 and Vat Yellow 82.

Other transparent polymers could also be used for the filter. Acrylic, Poly Carbonate, Polyester, Polyethylene and Polylactic Acid are all suitable and can be injection molded. Each resin would require a different pallet of dyes. One of ordinary skill in the art could create a very comprehensive list of possibilities. One of ordinary skill in the art could configure different pallets of dyes for use with different transparent resins. One having ordinary skill in the art would be able to make different transparent resins without undue experimentation. Different transparent resins can be made to create different absorption curves by one having ordinary skill in the art with reasonable expectation of success.

Test Solution:

The test solution will take one of two forms. The first presented is the preferred method. It is envisioned that the test solution may need to be stability tested. Pending the results of the stability testing, the test solution may need to be altered.

Form 1:

The preferred form is for a single solution comprised of:

| Component | % w/w |
|---|---|
| Acetaldehyde ($C_2H_4O$) | 0.98 |
| Vanillin ($C_8H_8O_3$) | 0.99 |
| Ethanol (Max water 5%) | 39.28 |
| Hydrochloric Acid (HCl) | 58.75 |
| Total | 100.00 |

Each vial would contain 2 mLs of the test solution containing HCl.

Form 2:

If Form 1 fails to meet stability parameters, then the following solution will also work:

| Component | % w/w |
|---|---|
| Acetaldehyde ($C_2H_4O$) | 2.38 |
| Vanillin ($C_8H_8O_3$) | 2.40 |
| Ethanol (Max water 5%) | 95.62 |
| Total | 100.00 |

In Form 2 there would be two test vials or a single two chamber vial. In the two-vial embodiment or in the two-chamber embodiment, respectively, one vial or one chamber would contain 1.2 mLs of hydrochloric acid and 0.8 mLs of test solution. The two components would be mixed when the sample is added by adding the sample to the testing solution, then adding HCl to the testing solution containing the sample.

In both forms, the reaction moves forward as follows:

Δ-9 THC+Vanillin+Acetaldehyde→Chromophore $C_{21}H_{30}O_2 + C_2H_4O + C_8H_8O_3 \rightarrow C_{31}H_{38}O_3 + 2H_2O$ The reaction proceeds in the presence of HCl and is augmented by an increase of temperature.

Figure 1:
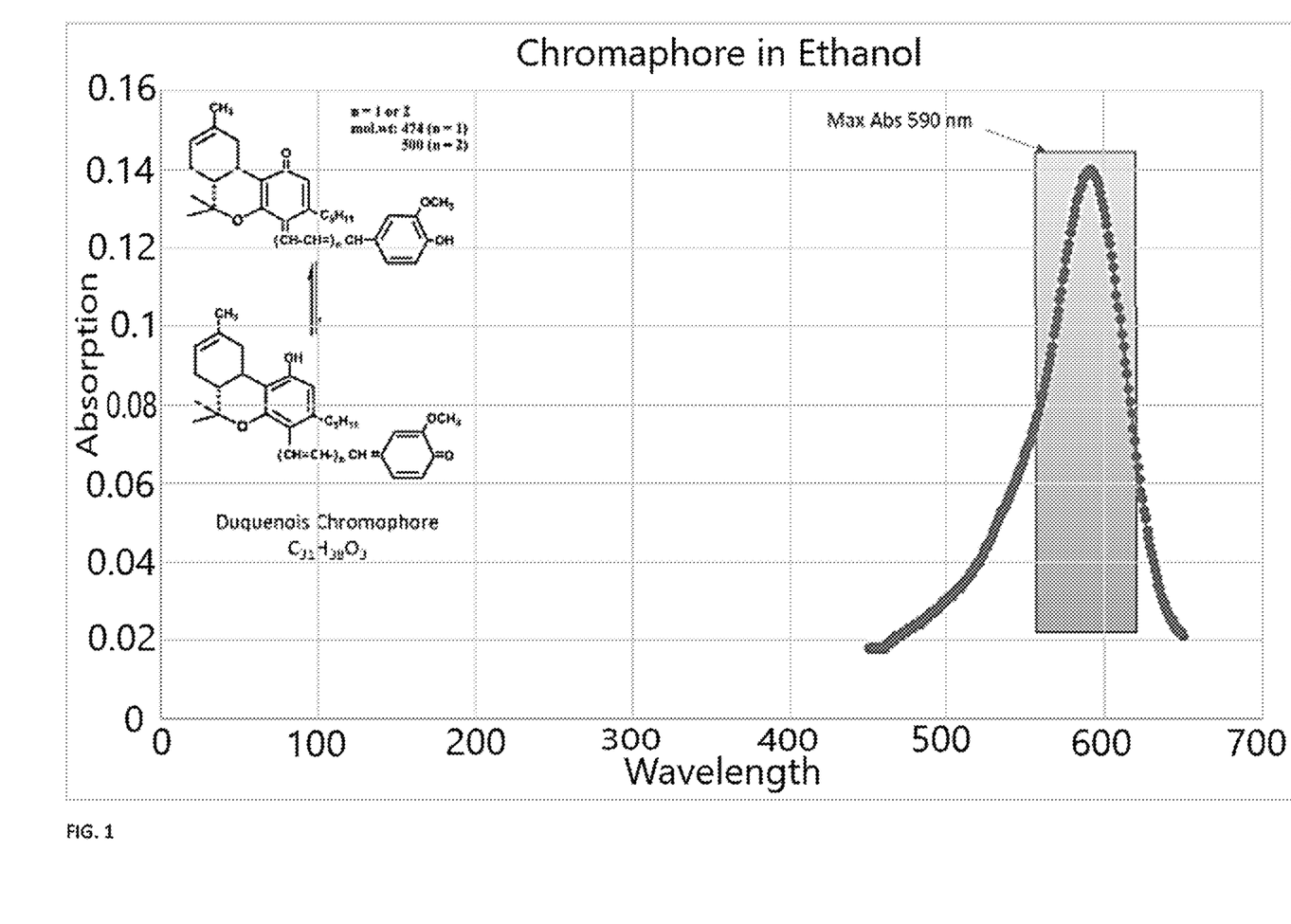
FIG. 1 is the absorbance scan of the chromophore in ethanol.

The chromophore produced by this reaction produces an absorbance spectra as shown in FIG. 1.

The reagents of the test solution in the present disclosure are the same as the reagents in the existing Duquenois Levine Test except for the use of chloroform. In the existing Duquenois Levine Test, this molecule is extracted into chloroform which does change the color and the resulting absorbance spectra. The reason for the extraction is that there are 40 or more substances that will produce a color reaction with vanillin and Acetaldehyde in the presence of acid. The tests takes into account the full color curve not just the peak at 590 nm. Some of the tested substances show some absorbance at this point. But the entire shape of the curve is different. However, only the molecule produced from Δ-9 THC has been found to extract into chloroform.

Although other molecules have color, none has been found to have the same absorbance curve in the above test solutions. If a compound is found with an identical curve, this would not be a problem for the use of the product. In forensic drug testing, all products are required to be tested by two different means to be declared a positive test.

Nothing has been found that has the same curve. If something were found, it would be caught by the required confirmatory test. While visible light absorbance is not typically used for identification, it can be used for exclusionary purposes. Therefore, since the known false positive color reactions do not produce the same absorbance curve, they can be excluded via a colorimetric analysis.

The reaction in question will proceed to completion in approximately thirty minutes. When using this for quantification purposes it is important to let the chromophore formation reaction go to completion, or at least until enough color has formed to prove a Δ-9 THC concentration above the legal limit.

With the introduction of gentle heat approximately 20° C. the reaction will speed up such that it will be complete in five minutes or less. For ease of use therefore it would be recommended that gentle heat be applied regardless of the testing system. If the tester does not include a heating element, this can be done with emersion of the sample vial in a cup of hot water.

Tester Design

As stated above there are four viable approaches to preparing the tester.

Option 1: Color Chart

The reflection spectra complimentary to the color curve generated by the reaction with the test solution can be reproduced with combinations of commercial inks. Printing a chart with color lines of increasing strength can allow for a simple estimation of THC strength.

The test vial would need to have a rectangular cross-section so that the absorption by the test solution in the vial would be consistent.

Figure 2:
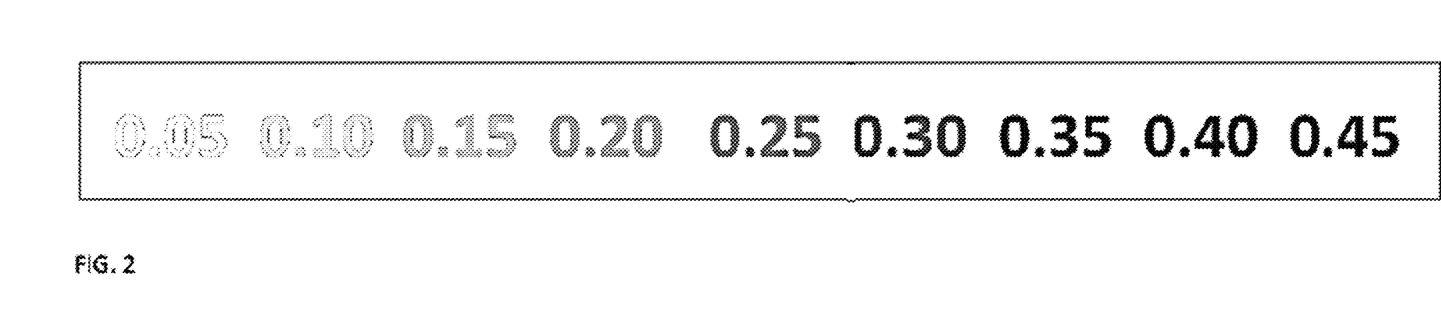
FIG. 2 is a test strip printed card with colored numbers.

The test strip of FIG. 2 would be a printed card with color bars or colored numbers that would only be visible when the reflected color strength exceeded the absorption capacity of the sample. While another compound might be close enough to fool the eye, when compared to a standard, it should stand out to the eye.

Based on the way the eye sees color, a total DE of 1-1.5 may not be noticed. When a human eye looks at a single color axis, then the human eye has a greater ability to distinguish. Here the visual range drops all the way to DE of 0.5.

In this version, once the mixture had fully reacted, the vial could be slid across the card. The first number appearing would be the concentration of the solution. Alternatively, the card could have an actual gradient with concentration markers.

Advantages: Cheap to produce and easy to use.

Disadvantage: The primary disadvantage of this process is that it relies on the visual acuity of the user and there is no standard training or certification of law enforcement personnel. The secondary disadvantage of Option 1 is the accuracy of the test would be affected by ambient light. Light intensity and actual ambient wavelengths vary greatly by time of day, location and source.

It is envisioned that this approach could possibly be combined with a cellphone app that can measure color differences. It is envisioned that this approach would work if the filter described for the fob device is used as a standard and a uniform first surface reflecting mirror, a laser mirror, behind the samples so that a uniform illumination can be guaranteed.

The light from the phone would pass through both samples, reflect of the mirror and then the camera would read the color. I have been told that George Nana at the water testing center had been working on one. So there may be a program somewhere in the Purdue system that we can use.

Option 2: Retask Turbidity Meters

Turbidity meters currently on the market use light across much of the visible spectrum. A vial coated with the filter listed in the Optical Filter section would restrict the instrument to only reading the desired wavelengths.

The test vial would need to be coated with the optical filter.

A solid standard sample would have to be produced so that the user could compare the nephelometric turbidity units (NTU) reading of the standard to the NTU reading of the sample.

In this version, a solid plastic sample could be produced in GPPS with a combination of solvent violet 13 and solvent violet 38 at an approximate loading of 0.5%. Alternatively, solvent 14 could also be used. This sample discriminates if the curves are different. If the absorption curve is different, then the reading will be different.

Advantages: cheap to produce. provides objective data vs. a set standard.

Disadvantage: The tester is not giving direct absorbance data and would need to be converted. This might complicate analysis.

Option 3: Fob Tester

Figure 3:
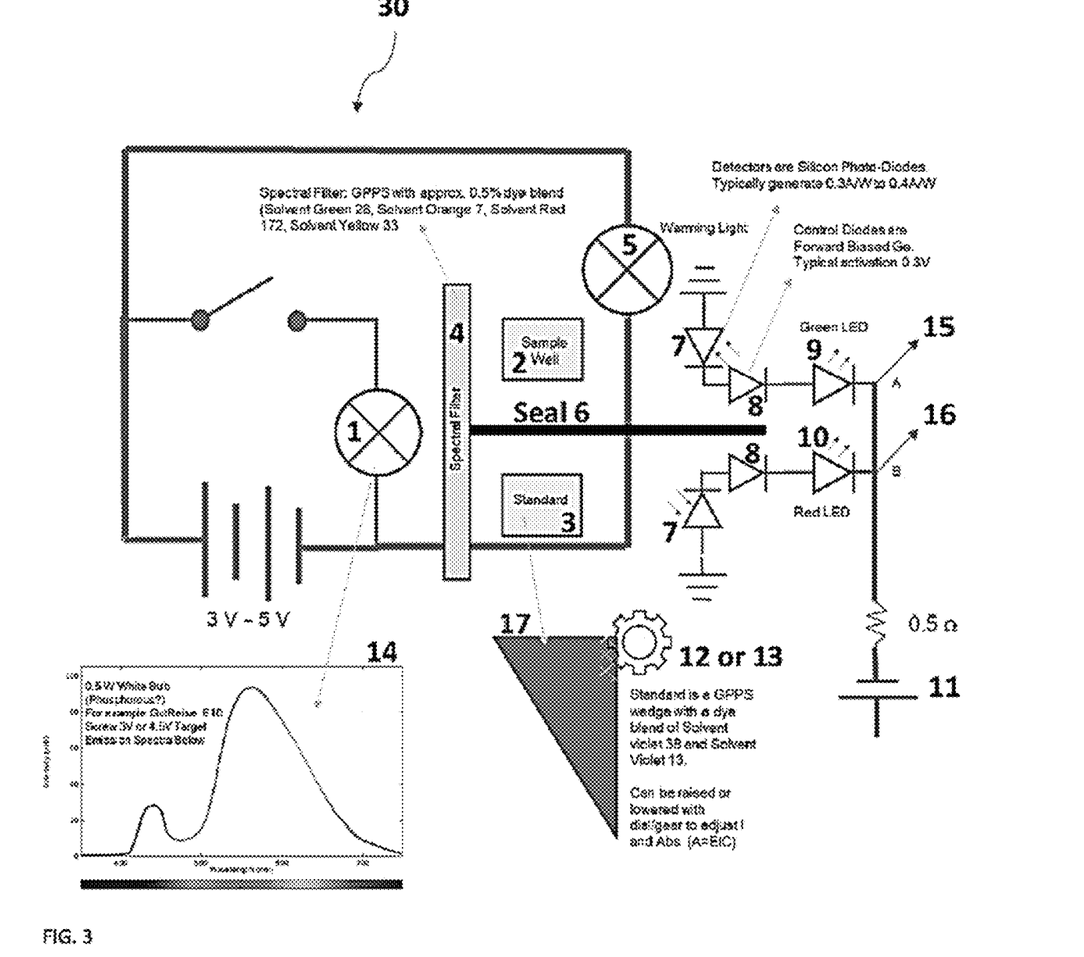
FIG. 3 is the FOB Tester according to the preferred embodiment of the present disclosure.

The Fob tester 30 uses a light source 1 to shine light through a sample well 2 and a standard 3. The light source 1 can be a white LED or a bulb. Commercially available bulbs like the GutReise Screw E10 3V or 4.5V can produce 0.5 W light in appropriate wavelengths for the absorption peaks of the chromophore generated in the reaction mixture in the sample well 2. An appropriate wavelength emission range for the chromophore generated from the Δ-9 THC reaction would peak at about 550-650 nm, as shown in the Target Emission Spectra 14.

In one embodiment of the present tester, the light from source 1 would be shone through the testing solution containing the sample in a clear vial 2 and through the standard 3. Both paths would then shine through the spectral filter 4 as described in the optical filter section. Both optical paths, through the sample and through the standard, would be sealed from each other, via seal 6, so that there is no light bleed between the two. The filter 4 would block all wavelengths outside of the desired range such as less than about 560 nm or greater than about 620 nm.

The reaction mixture would be generated in the test vial (sample well 2) as in the previous testers, rendering a chromophore as shown in the test solution section. A heating element, such as the warming light 5, can be used to speed up full completion of the chromophore production.

The standard 3 could be a wedge 17 formulated like the standard used for the retask turbidity meter. The standard 3 can be a solid plastic standard produced from general purpose polystyrene (GPPS) with a combination of solvent violet 13 and solvent violet 38 at an approximate loading of 0.5%. Alternatively, solvent 14 could also be used.

The filter 4 could also be a solid plastic produced from GPPS wedge colored with a combination of solvent violet 13 and solvent violet 38 at an approximate loading of 0.5%. Alternatively, solvent 14 could also be used.

Other transparent resins could also be used for the filter as described in the optical filter section.

The sample solution in well 2 and the standard 3 would absorb light in their desired range, for example, the blue portion of the chromophore in ethanol chart. Each path, from the sample and from the standard, would strike a detector, such as the silicon photodiode 7 capable of generating 0.3 to 0.4 A/W.

The photodiodes 7 would each be connected to a control diode, such as a forward biased Germanium Diode 8 requiring 0.3V to activate. This would then be connected to either a green LED 9 or a red LED 10 and ultimately both paths are connected back to each other when node A 15 (from the green LED 9) and node B 16 (from the red LED 10) connect. After node 15 connects back to node 16 the path is connected to a low voltage negative voltage source 11. The resister helps control the voltage ratio between the active arm and ground.

In the preferred embodiment of the present tester, the filter 4 is located between the light source 1 and the sample well 2 and the standard 3. Whichever path between the sample or the standard absorbs more light will produce less voltage. Because node 15 and 16 connect, whichever node is stronger will reverse the polarity of the voltage across the other control diode 8. In effect making it reverse biased closing the current path. As a result, only the LED in the open path will light (9 or 10). The FOB Tester 30 according to the preferred embodiment of the present disclosure is shown in FIG. 3.

Wedge 17 allows the path length to be adjusted as needed. The Beers-Lambert equation states that absorption is proportional to path length and concentration. $A=EIC$, where E is the extinction coefficient. As the wedge 17 is raised or lowered, with a dial 12 or a gear 13, the path length of the light passing through the wedge will increase or decrease causing a proportional change in the absorption of the standard.

The dial can be calibrated to the existing color strength of solutions of known concentrations. The dial can be set to whatever range is desired by modifying the dye concentration and the angle of the wedge. The dial can be set to the 0.3% or amounts above or below.

The dyes used are all selected from a pallet that is known to be stable and non-migratory in the plastics they are recommended for. Ensuring the position is a matter of engineering. It can only be confirmed on the manufactured part.

Option 4: Advanced Fob Tester

A variation of the above Fob Tester is envisioned where a diode array is designed to emulate the desired absorption curve. This is beyond my electronic expertise to design.

While this disclosure has been described as having an exemplary design, the present disclosure may be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains.

What is claimed is:

1. A device for quantification of delta-9-tetrahydrocannabinol (Δ-9 THC) in a sample, the device comprising:
    a light source for providing a light with a wave-length range of 550-625 nm;
    a sample holder made from a material that can allow the light to pass;
    a testing solution;
    a heating element for applying heat to a reaction mixture;
    a reference element as a standard;
    a light filter allowing a light with wavelength range of 550-625 nm to pass, the light filter comprising a grating, prism, and/or made from a polymer and/or a transparent resin;
    a photodiode detector; and
    a printed card with color bars or colored numbers, a cellular phone app that can measure color differences, or a turbidity meter;
    wherein a reaction mixture is generated by adding the sample and a testing solution into the sample holder;
    wherein the light is shone through the testing solution containing the sample and through the standard, and through the light filter; wherein both optical paths, the sample and the standard, are sealed from each other so that there is no light bleed between the two;
    wherein the standard is made from general purpose polystyrene (GPPS) with a combination of solvent violet 13 and solvent violet 38;
    wherein a chromophore is produced in the reaction mixture, wherein the heating element can be used to speed up the complete production of the chromophore;
    wherein the photodiode detector measures the absorption of the chromophore.

2. The device of claim 1, wherein the light filter allows a light with wavelength range of 580-615 nm to pass.

3. The device of claim 1, wherein the light filter is made from GPPS, wherein the GPPS is injection molded with a dye blend, wherein the dye blend comprises nonmigratory dyes.

4. The device of claim 3, wherein the dye blend comprises a mixture of Solvent Green 28, Solvent Orange 7, Solvent Red 172 and Solvent Yellow 33.

5. The device of claim 3, wherein the dye blend comprises a mixture of Solvent Red 1, Solvent Red 207, solvent yellow 82, Vat Red 41 and Vat Yellow 82.

6. The device of claim 1, wherein the light filter is made from transparent resins, suitable to be injection molded, selected from the group consisting of: Acrylic, Poly Carbonate, Polyester, Polyethylene and Polylactic Acid.

7. The device of claim 1, wherein the reference element used as a standard is wedge-shaped such that the path length can be adjusted as needed.

8. The device of claim 1, wherein the light source is a white LED.

9. The device of claim 1, wherein the light source is an E10 3V or 4.5V white bulb.

10. The device of claim 1, wherein the light filter blocks wavelengths less than 560 nm and greater than 620 nm.

11. The device of claim 1, wherein each optical path strikes at least one silicon photodiode capable of generating a photosensitivity of 0.3 to 0.4 A/W.

12. The device of claim 11, wherein each silicon photodiode is connected to at least one forward biased germanium diode requiring 0.3 V to activate; wherein each germanium diode is then connected to at least one colored LED and ultimately, each optical path is connected back to each other and to a low voltage negative voltage source.

13. The device of claim 7, wherein the wedge is adjusted by a gear, wherein the gear is capable of raising and lowering the wedge, wherein the path length of the light passing through the wedge increases or decreases, causing a proportional change in the absorption of the standard.

14. The device of claim 13, wherein a dial can be calibrated to the existing color strength of solutions of known concentrations.

15. The device of claim 1, wherein the light source is a commercially available bulb and the heating element comprises a warming light or hot water.

* * * * *